June 10, 1958    R. W. BLISS, JR    2,838,043
SOLAR WATER HEATING SYSTEM
Filed July 2, 1954
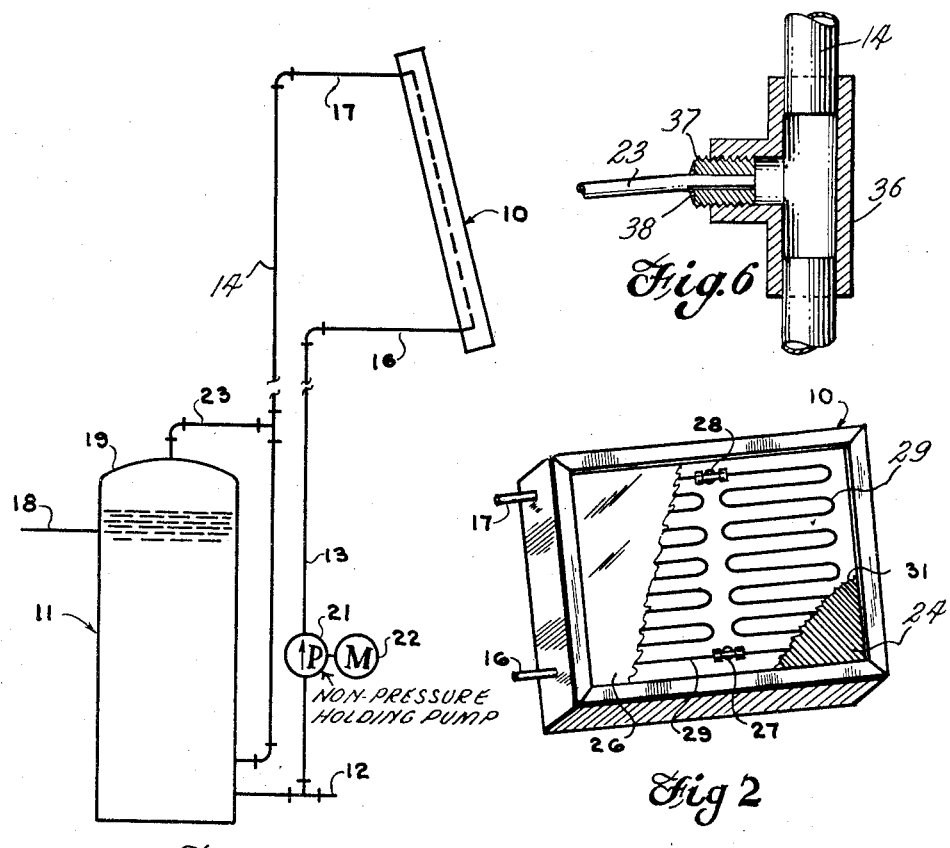
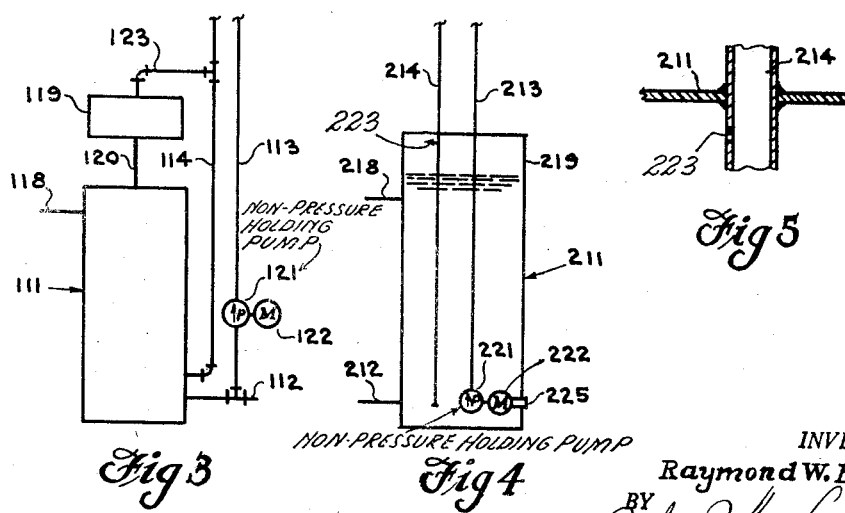
INVENTOR.
Raymond W. Bliss Jr.
BY John J. McLaughlin
ATTORNEY.

United States Patent Office 2,838,043
Patented June 10, 1958

2,838,043

SOLAR WATER HEATING SYSTEM

Raymond W. Bliss, Jr., Amado, Ariz.

Application July 2, 1954, Serial No. 441,118

5 Claims. (Cl. 126—271)

My invention relates in general to solar water heating systems, and more in particular to a self-draining solar water heating system having advantages and features not heretofore known, as will be explained in the following specification.

Solar heating systems have occupied the attention of experimenters and inventors for many years; and in some parts of the country, hot water solar heating systems are not uncommon. The principal advantage normally expected of solar heating systems is definite operating economy as compared with conventional systems of the prior art. In general, where solar heating systems are employed for heating washing water, a tank is mounted above the solar heat collector and the thermo-siphon effect is depended upon for circulation. This arrangement introduces marked disadvantages for general application for several reasons. One obvious disadvantage is that the mounting of a relatively heavy tank to hold an ample supply of hot water in a high location involves considerable installation expense. Still another disadvantage of this system is that the collector is necessarily always filled with water, and freezing can occur during the night; or, if freezing does not occur, there is at least a substantial loss of heat.

Various methods have been suggested for overcoming the main disadvantages of thermo-siphon systems. In some proposals a pump and thermostat are employed, the former responsive to the latter, to circulate the water until the temperature of the water in the collector has been reduced below a predetermined range. Such a system permits the tank to be placed below the collector, but it does not reduce hazards from freezing during the night because it will not drain automatically when the pump is stopped so long as it is connected to a source of feed water under pressure.

Other proposals are to circulate through the collector a fluid which will not freeze at temperatures to which the collector will be subjected at night, and to depend on heat exchange devices to transfer heat from the low freezing point fluid to the hot water system. Installations of this type tend to be relatively expensive, and they may cost several times the installation of a conventional hot water system and be unattractive for this reason.

The principal object of my invention is the provision of an improved, self-draining, solar water-heating system.

Another object is the provision of a simple, relatively inexpensive, solar water-heating system which avoids the disadvantages of prior art systems.

I have avoided the problems of systems of the prior art and secured the objects of my invention by a relatively simple but effective arrangement in which the heat collector is placed in its normal elevated position and the hot water storage tank at a low level—for example, below ground in certain instances—and water is circulated continuously during sunshine hours between the hot water storage tank and collector by means of a relatively small pump. The entire system is placed under pressure and feed water is supplied by connecting a source of cold water under pressure to the bottom of the hot water storage tank.

The hot water outlet is near the top of the tank, but an air space is provided in communication with the tank, optionally at the top of the water storage tank, and above the hot water outlet, the air space comprising volumetrically more than the total volume of that portion of the system above the air space which is to be drained. By providing a bleeder line between the air space and one of the lines providing circulation between the hot water storage tank and the collector, water will automatically flow from the collector to the storage tank when pump action is discontinued, and air will flow through the bleeder line from the air space into the collector and into the entire portion of the system above such air space. The pump may of course be controlled manually, or it may be responsive to sunshine conditions by commonly known methods. If the pump is below the level of the air space, normal operating conditions are established very shortly after pump operation is initiated, regardless of the type of pump used. If the pump is in the air space above the water line established when the system is designed in the manner described, then in general a positive displacement pump is required to initiate water circulation.

Other objects and specific features of my invention will be made apparent by the following description taken with the accompanying drawings, wherein:

Fig. 1 is a partially schematic view showing one embodiment of my invention;

Fig. 2 is an isometric view partially broken away showing structural features of one type of solar heat collector which may be employed in the system of my invention;

Fig. 3 is a partially schematic view showing a modified system;

Fig. 4 is a partially schematic view showing a still further modification;

Fig. 5 is a fragmentary sectional view showing a detail which may comprise a part of the system of Fig. 4, and Fig. 6 is a detail view showing one manner in which the bleeder line may be connected into the main water circulating line between the storage tank and solar heat collector.

Referring now to the drawings, the system of my invention comprises a solar heat collector 10, a water storage tank 11, a cold water inlet pipe 12, and circulating pipes 13 and 14 leading to inlet pipe 16 and outlet pipe 17, respectively, of the collector. An outlet pipe 18 is provided for withdrawing hot water from the storage tank 11, and an air space 19 is provided at the top of the tank above the said outlet pipe 18. A pump 21 operated by a motor 22 is placed in the pipe 13 to circulate water upwardly through the pipe 13 through the collector 10 and downwardly through the pipe 14 back to a position near the bottom of the water storage tank 11. A bleeder line 23 is provided between the air space 19 and the pipe 14.

While my invention is not particularly concerned with the type of collector employed except that it should drain, for the convenience of those skilled in the art I have shown a preferred form which I have used to advantage in the system of my invention. This collector comprises a suitable rectangular frame with a back portion 24 of insulating material and a covering glass 26. The inlet pipe 16 connects to a T forming a bottom header 27, and the outlet pipe 17 to a T forming a top header 28. Tubing 29 interconnecting the two headers is brazed or soldered to a copper collector plate 31. The tubing 29 and copper plate 31 are treated to provide a black surface for efficient absorption of sunshine. The tubing may be arranged in many different ways. In thermo-siphon systems a relatively large number of individual tubes between top and bottom headers may be used to advantage. I prefer, in my system, to use a smaller number of individual tubes to obtain faster circulation in individual tubes. Two tubes, such as shown, may be used to advantage. The individual loops should be so arranged, however, that no "pockets" are formed and all of the water will readily drain therefrom.

The manner in which solar heat collectors of this type operate is well known. Sunshine passes through the glass cover, is absorbed upon the blackened collector plate and converted into heat energy. Under normal operating conditions a portion of this heat energy is lost by conductive, convective, and radiative heat transfer from the plate to the glass and from the plate to the insulation behind it. The remainder of the heat energy is available for raising the temperature of the circulating water. It is to be noted that both convective and radiative heat losses are impeded by the glass cover since glass, although it is transparent to most of the solar spectrum, is substantially opaque to the long-wave length radiation emitted by the plate.

It is possible to use two or more air-spaced glass covers in place of the single cover 26. Such construction decreases the overall heat transfer coefficient from plate to outer air, but it also decreases the amount of entering sunshine. Hence more than one glass cover should be used only when a relatively high plate to outdoor air temperature differential must be maintained. For domestic water-heating applications in the more temperate parts of the country a single glass cover is preferable. The size and specific arrangement of the collector are determined by the amount of hot water required and the desired temperature.

The air space or air pocket 19 preferably is large enough volumetrically to replace with air all the water in the system above such air space. It must be large enough to replace the water in all of the system which it is desired to drain. Preferably there is somewhat of an excess of air so that there will be an assurance under all circumstances that all of the water in the system which would otherwise be exposed to low temperatures is replaced with air. I have found that it may or may not be necessary to periodically replenish the air supply in pocket 19. If the incoming cold water is saturated or nearly saturated with air, a sufficient amount of air will be driven off during heating to maintain the air pocket. If the incoming cold water is not sufficiently saturated, additional air may be introduced by a venturi-tube type aspirator placed in the cold water supply line 12 or by other suitable means. Any excess of air in the air pocket will pass off automatically through outlet 18 or, if desired, excess air may be vented by means familiar to those skilled in the arts of steam and hot-water heating.

A solar water-heating system such as I disclose preferably should have a hot water storage tank sufficiently large and sufficiently well insulated so that there will be an ample supply of hot water during periods when the sun is not shining. The size of the pump required to maintain suitable circulation depends to some extent upon the capacity of the system as a whole. I have found that in a system of a size to accommodate the needs of an ordinary family and take them through the night without having to use any auxiliary means to heat water, the pump 21 may have a capacity, for example, of one or two gallons per minute. Lesser flow rates than this are possible in this system and common in thermo-siphon systems. They are undesirable for two reasons. First, such low flow rates lower the heat transfer coefficient between collector tubes and circulating water and thus impede the flow of heat into the water. Second, a very low flow rate results in small quantities of high-temperature water being delivered to the tank and there mixed with considerably colder water in the tank. This is undesirable since it results in the collector operating at a higher temperature than is necessary to bring the water in the tank to the desired temperature.

In the embodiment of Fig. 3 a separate tank 119 connected to the main tank 111 by means of a connecting pipe 120 is employed. For convenience the parts of this embodiment which are identical with the embodiment of Fig. 1 are given the same reference characters but with the prefix "1" to indicate modification. In this arrangement the entire tank 111 may be buried, and the air-water displacement tank 119 placed at any suitable level above the storage tank but in a convenient position to drain water from the portion of the system above it. When the system drains itself after stopping of the pump, the water normally may flow downwardly through both of the pipes 113 and 114 when the pump is stopped, but principally through pipe 113; and the air in the tank 119 is bled over to the pipe 114 by means of the bleeder line 123.

In the embodiment of Figs. 4 and 5 the same reference characters are again used as in Fig. 1 to identify similar or identical parts, but with the reference character "2" to indicate the second modification. In this form of the invention the pump 221 and motor 222 are submerged, an electrical connection 225 being sealed through the tank 211 to provide driving power to the motor. Submerged motor and pump combinations are well known, and it is not deemed necessary to an understanding of my invention to show the same in detail. It is sufficient to note that the pump 221 is adapted to deliver water from the tank to the pipe 213. In this embodiment, as shown in Fig. 5, the bleeder line may take the form of an opening 223 in the pipe 214 within the tank 211 but above the water line.

The bleeder lines 23 and 123 as indicated in Figs. 1 and 3, and bleeder opening 223 in Figs. 4 and 5 should be so dimensioned and constructed that required quantities of air will freely pass therethrough when the circulating pump is stopped; but water, at least in appreciable amounts, will not flow therethrough while the circulating pump is operating. Several means of accomplishing this result are available, and I indicate one suitable arrangement in Fig. 6.

In this figure, based on the showing of Fig. 1, the circulating pipe 14 which passes heated water from the collector 10 to the storage tank 11 is provided with a T 36 into the side outlet of which an apertured plug 37 is threaded, and to which the bleeder line 23, suitably a copper tube, is brazed as at 38 to form a connection to the line 14. It is, of course, understood that any of the standard type fittings for attaching a copper tube to a plumbing type fitting can be used. Assuming the circulating line 14 is a three-quarter inch pipe, the tube comprising bleeder line 23 may be, for example, one-eighth inch in diameter.

In order to assure substantially instantaneous action to deliver air through bleeder line 23 to the system for replacement of water in the collector 10 or other portions of the system above the tank 11 which may be exposed to freezing temperatures, it is essential that the bleeder line be open for free passage of air without convolutions, curves or traps such that water could collect therein and prevent free flow of air. Fig. 6 shows the bleeder line sloping slightly upwardly for free air movement therethrough. It should be understood, however, that upward sloping is not required, so long as there is not sufficient downward slope or configuration such as to trap water which will have the effect of preventing the air bleeding action desired.

In the operation of the system of my invention the water is delivered from the tank 11 to the collector 10 through line 13, and the return from the collector 10 to the tank 11 is through line 13. This action prevents appreciable mixing of the circulating water with the hot water at the top of the tank. For this reason it is desirable that little or no circulating water returned from the collector be delivered through the bleeder line (23, 123) or bleeder hole (223). Various means for effecting this result are available. One method is to form the bleeder pipe or hole relatively small. Another method is to provide a check valve (not shown) which will pass air in one direction but will not pass water in the opposite direction. Generally, however, if water is moving along a pipe in a closed system of substantially uniform pressure throughout, it will not pass through a side orifice, as of a bleeder pipe or hole, but will follow its normal direction of flow. A venturi type construction may be employed at the bleeder opening, but care must be taken not to aspirate too much air through such a device.

The forms of the invention shown and described are illustrative but not limiting. In general I prefer to employ a simple, relatively inexpensive, rotary type of pump placed in the delivery line 13 (Fig. 1) below the level of the area 19 so that the pump will always be submerged and circulation will be initiated as soon as the pump is started. A positive displacement pump, however, may be placed anywhere in the circulating portion of the system. I wish also to point out that while it is preferable that the bleeder line 23 be connected to the line 14, in practice it may be connected to any portion of the system above the normal water line in the storage tank 11. By way of example, it may be connected to the collector 10 or the line 13. If assumption is made that the bleeder connection were to the line 13, then it would be obvious that there would be a tendency for some water under pressure to be delivered through the bleeder line 23, unless, of course, a suitable check valve were installed in this location. Even without a check valve, however, I have found that the system works adequately with the bleeder line in any of the circulating part of the system above the normal water line in the storage tank.

The system of my invention is not only relatively inexpensive to install, but very inexpensive to operate. If suitably designed capacity-wise and with proper insulation, it will function to deliver hot water as needs require between sundown and sunrise, and will even carry through a cloudy period, at least such cloudy periods as occur in the southwestern part of the United States.

It is obvious that the system of my invention may be combined with any other system, for example, a gas or electric heater responsive to decreased water temperature and operable during extended cloudy periods. With a properly-sized solar heat collector, however, the system of my invention will tend to deliver hot water at reasonably constant temperature every sunny day despite considerable variation in the amount of water used. This is because the collector's heat collection efficiency drops off rapidly with increasing water temperature. The collector is capable of heating a relatively large amount of water to a reasonably high temperature, say 140° F.; but it can heat only a much smaller quantity of water to 180° F. These temperatures are illustrative, however, since design and capacity for a given purpose are always factors.

In addition to the self-draining feature which prevents damage from freezing, the system also has the advantages and functions of positively circulating the water between the collector and the lower part of the tank, thereby avoiding mixing of previously heated water with colder water. The system also makes possible the use of a collector of lower capacity, due to the fact that water is removed each time heat collection is stopped. Continuous mechanical circulation also results in lowering the temperature differential between the circulating water and the collector tubing as contrasted with corresponding temperatures in thermo-siphon systems.

I have indicated hereinabove that in those instances where a rotary type of pump is used it is preferable to locate it below the drained area so that it will not lose its prime; however, it is not essential that the pump have this location because many arrangements well known in the art are available (such as minor changes in piping arrangement and the use of check valves, with none of which my invention is primarily concerned) for retaining the pump's "prime." The system of my invention, in other words, will operate in the intended manner notwithstanding many changes, variations, and modifications which may be required to meet conditions encountered in many plumbing and water supply installations. The only requirement of the pump which cannot be varied is that the water be free to drain from the collector when pump action is discontinued. When the pump is in the general location indicated in the drawings, therefore, it is essential that it be of a non-pressure holding type. It is accordingly obvious for this and other reasons that while I have described my invention in detail so that those skilled in the art may understand the manner of practicing the same, the scope of my invention is defined only by the claims.

I claim:

1. In a solar water-heating system, a solar heat collector, a hot water storage tank below said collector, a cold water supply line connected to said tank, pipe connections between said collector and tank forming circulating lines for delivery of water from the tank to the collector and back to the tank, a non-pressure holding circulating pump in one of said water circulating lines, means providing an air space in communication with an upper portion of said tank said air space being closed to atmosphere whereby to cause static pressure therein to be the same as in the system, and a bleeder connection between said air space and a portion of said system above said tank which it is desired to drain.

2. In a solar water-heating system, a solar heat collector, a hot water storage tank below said collector, a cold water supply line connected to said tank, pipe connections between said collector and tank forming circulating lines for delivery of water from the tank to the collector and back to the tank, a non-pressure holding circulating pump in one of said water circulating lines, means providing an air space in communication with an upper portion of said tank said air space being closed to atmosphere whereby to cause static pressure therein to be the same as in the system, a bleeder connection between said air space and a portion of said system above said tank which it is desired to drain, and a water outlet connected to an upper portion of said tank below said air space.

3. In a solar water-heating system, a hot water storage tank, a supply water inlet to a lowermost portion of said tank, a solar heat collector above said water storage tank, a pipe connection between said collector and a lower portion of said water storage tank, a relatively small capacity non-pressure holding circulating pump in said pipe connection delivering water from said tank to said collector, a return pipe connection from said collector to a lower portion of said tank, an air tank, said air tank being closed to atmosphere, whereby pressure in said tank is the same as in the system, above said water storage tank and below said collector, a connection between a bottom portion of said air tank and a top portion of said water storage tank, and a bleeder connection between said air tank and a portion of the system above it.

4. In a solar water-heating system, a hot water storage tank, a supply water inlet to a lowermost portion of said tank, a solar heat collector above said water storage tank, a pipe connection between said collector and a lower portion of said water storage tank, a relatively small capacity non-pressure holding circulating pump in said pipe connection delivering water from said tank to said collector, a return pipe connection from said collector to a lower portion of said tank, an air tank above said water and below said collector storage tank said air tank being closed to atmosphere, whereby pressure in said tank is the same as in the system, a connection between a bottom portion of said air tank and a top portion of said water storage tank, and a bleeder connection between said air tank and a portion of said return line above it.

5. A solar water heating system comprising a water storage tank, a water supply line connected to a bottom portion of the tank, means providing an air space above said tank in communication with storage water in the tank, a water outlet for said storage tank at an upper portion thereof but below said air space, a solar heat collector above said tank, two water circulating lines between a bottom portion of the storage tank and said heat collector, one such line leading to a lower portion of the heat collector and the other to an upper portion of said heat collector, a relatively low capacity circulating non-pressure holding pump in one of said lines adapted to operate continuously while the collector is receiving sun heat to continuously circulate water from a bottom portion of the storage tank through the heat collector and back to a bottom portion of the storage tank without appreciable mixing with hot water in an upper portion of the tank, and means providing a free relatively small bleeder passageway between said air space and a portion of the system above the storage tank which it is desired to drain.

References Cited in the file of this patent

UNITED STATES PATENTS

| | | |
|---|---|---|
| 1,372,540 | Owens | Mar. 22, 1921 |
| 1,888,620 | Clark | Nov. 22, 1932 |

FOREIGN PATENTS

| | | |
|---|---|---|
| 587,741 | France | Apr. 23, 1925 |
| 28,130 | Great Britain | 1907 |